(12) United States Patent
M N et al.

(10) Patent No.: US 12,404,015 B2
(45) Date of Patent: Sep. 2, 2025

(54) ENERGY ABSORPTION SYSTEM FOR LANDING GEAR

(71) Applicant: Goodrich Corporation, Charlotte, NC (US)

(72) Inventors: Hemanth M N, Hassan (IN); Basavaraj Bodki, Bangalore (IN)

(73) Assignee: Goodrich Corporation, Charlotte, NC (US)

( * ) Notice: Subject to any disclaimer, the term of this patent is extended or adjusted under 35 U.S.C. 154(b) by 98 days.

(21) Appl. No.: 18/447,935

(22) Filed: Aug. 10, 2023

(65) Prior Publication Data

US 2024/0409207 A1   Dec. 12, 2024

(30) Foreign Application Priority Data

Jun. 7, 2023   (IN) .............................. 202341039006

(51) Int. Cl.
  *B64C 25/60*   (2006.01)
(52) U.S. Cl.
  CPC .................................. *B64C 25/60* (2013.01)
(58) Field of Classification Search
  CPC ............ B64C 25/60; F16F 9/342; F16F 9/486
  USPC ...................................................... 267/64.18
  See application file for complete search history.

(56) References Cited

U.S. PATENT DOCUMENTS

| | | | |
|---|---|---|---|
| 3,073,586 A | 1/1963 | Hartel | |
| 3,147,826 A * | 9/1964 | McHenry | B60G 15/12 188/289 |
| 3,152,667 A * | 10/1964 | Powell | F16F 9/486 188/289 |
| 3,458,016 A | 7/1969 | Keech | |
| 3,696,894 A * | 10/1972 | Brady | F16F 9/486 188/289 |
| 4,054,311 A * | 10/1977 | Gute | B60R 19/32 267/116 |
| 4,787,486 A | 11/1988 | Hrusch et al. | |
| 5,598,903 A * | 2/1997 | Richardson | F16F 9/504 188/269 |

FOREIGN PATENT DOCUMENTS

| | | | |
|---|---|---|---|
| EP | 0262246 | * | 10/1986 |
| FR | 992347 | | 10/1951 |

OTHER PUBLICATIONS

European Patent Office, European Search Report dated Oct. 31, 2024 in Application No. 24180011.9.

* cited by examiner

*Primary Examiner* — Tye William Abell
(74) *Attorney, Agent, or Firm* — SNELL & WILMER L.L.P.

(57) ABSTRACT

A shock strut assembly is disclosed herein. The shock strut assembly includes a mixed fluid chamber, a liquid chamber coupled to the mixed fluid chamber, a metering pin having a first end and a second end and a channel formed therein extending from the first end to the second end, the first end disposed in the liquid chamber and the second disposed in the mixed fluid chamber, and a pressure relief valve fluidly coupled to the liquid chamber and the channel in the metering pin, the pressure relief valve configured to allow a flow of a fluid from the liquid chamber to the channel in the metering pin.

20 Claims, 5 Drawing Sheets

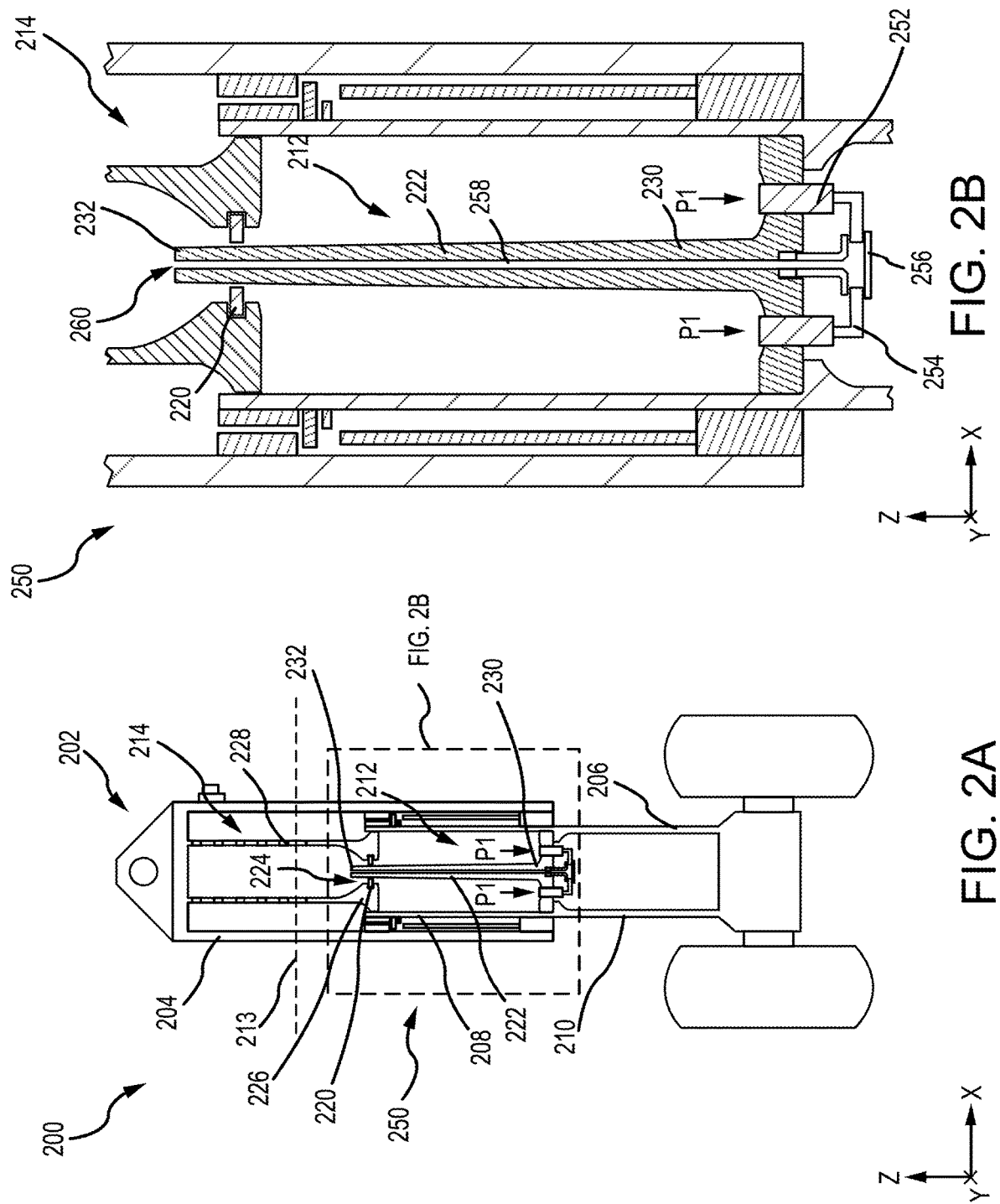

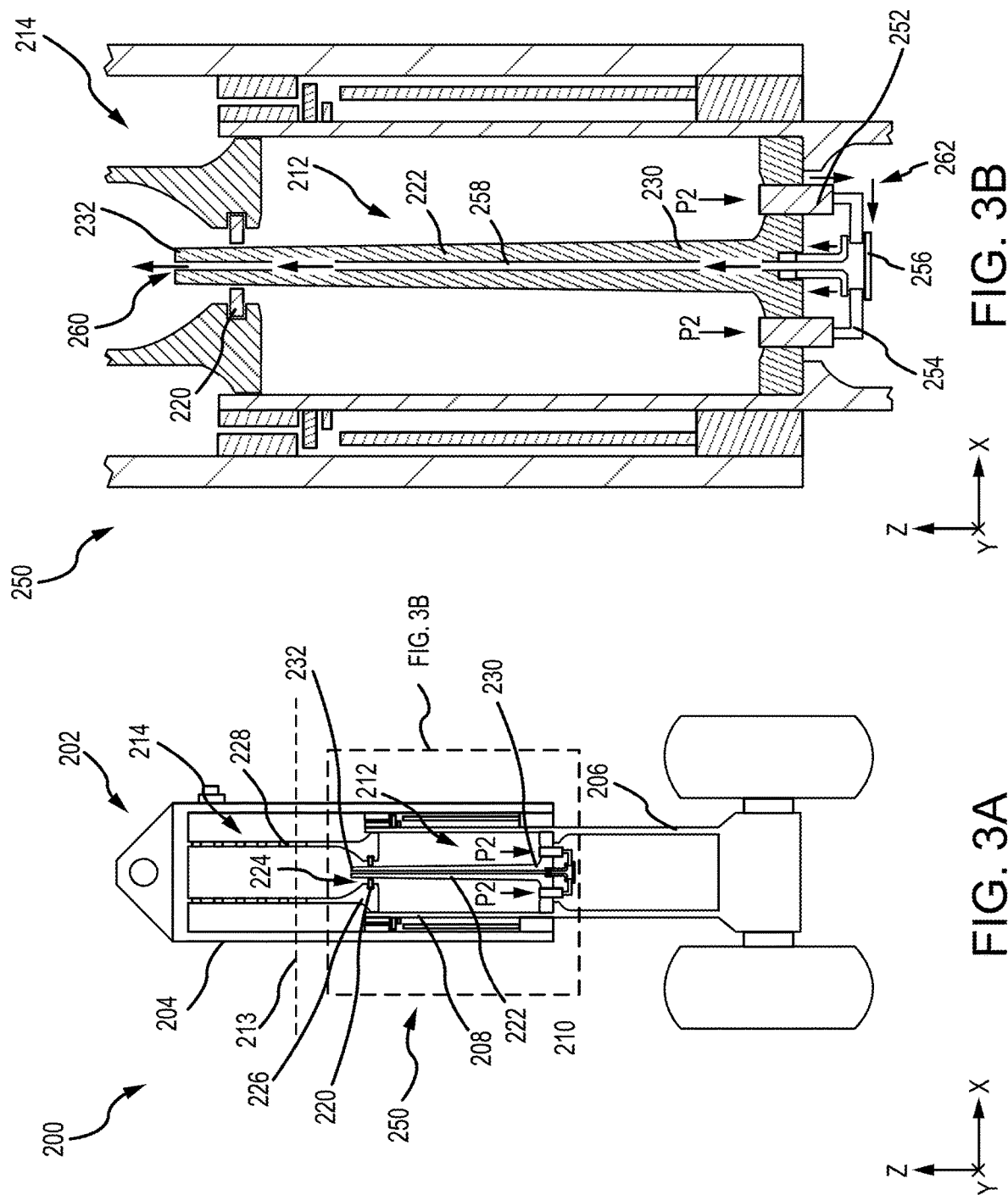

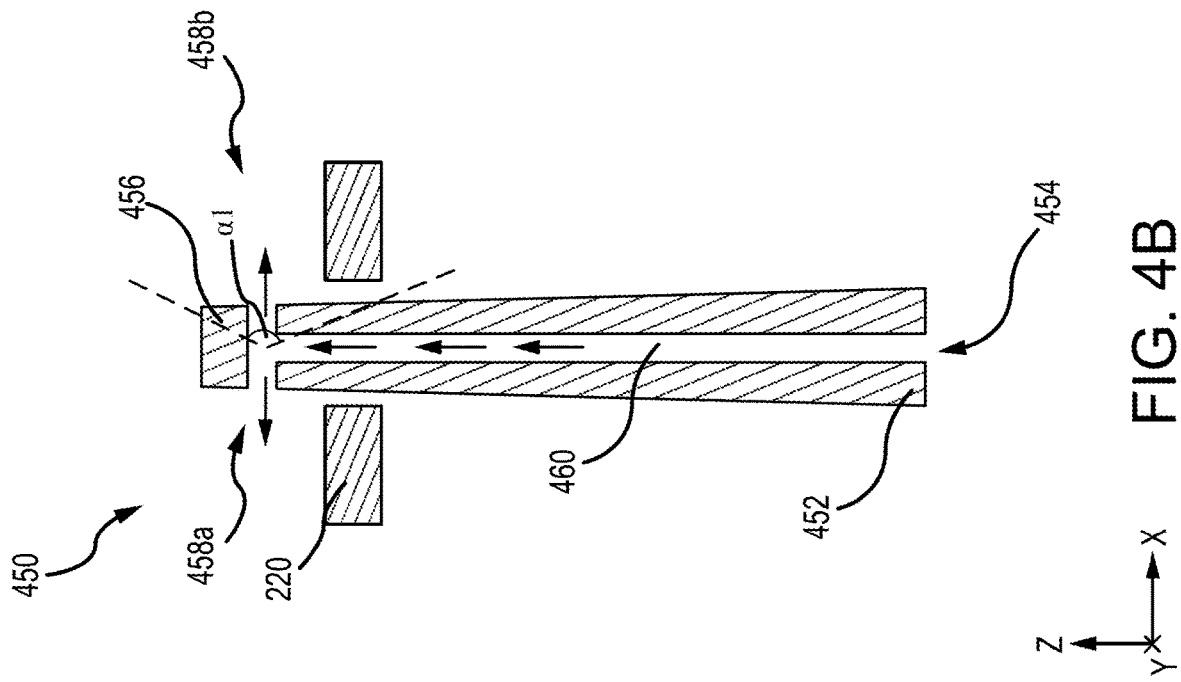
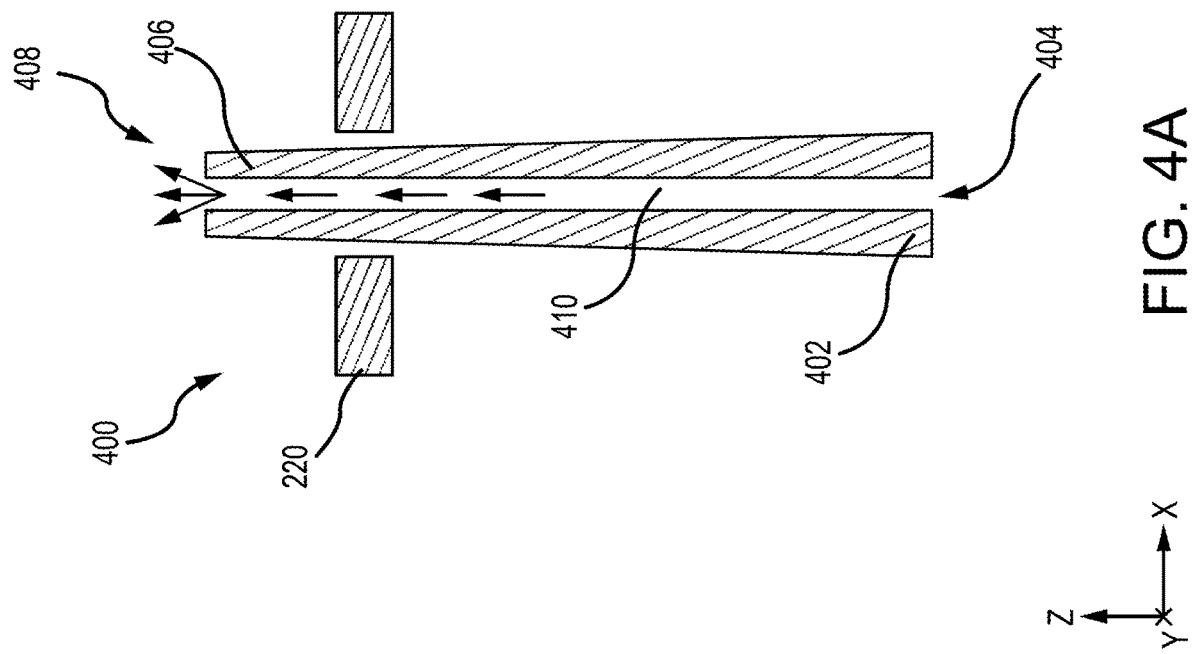
FIG. 4A
FIG. 4B

ENERGY ABSORPTION SYSTEM FOR LANDING GEAR

CROSS-REFERENCE TO RELATED APPLICATIONS

This application claims priority to, and the benefit of, India Provisional Patent Application No. 202341039006, filed Jun. 7, 2023 (DAS Code 2D4F) and titled "ENERGY ABSORPTION SYSTEM FOR LANDING GEAR," which is incorporated by reference herein in its entirety for all purposes.

FIELD

The present disclosure generally relates to aircraft landing systems and, more particularly, to systems and methods to improve shock strut performance

BACKGROUND

Shock absorbing devices are used in a wide variety of vehicle suspension systems for controlling motion of the vehicle and its tires with respect to the ground and for reducing transmission of transient forces from the ground to the vehicle. Shock absorbing struts are a common component in most aircraft landing gear assemblies. The shock struts used in the landing gear of aircraft generally are subject to more demanding performance specifications than many ground vehicle shock absorbers. In particular, shock struts control motion of the landing gear, and absorb and dampen loads imposed on the landing gear during braking, landing, taxiing, and takeoff.

A shock strut generally accomplishes these functions by compressing a fluid within a sealed chamber formed by hollow telescoping cylinders. The fluid generally includes both a gas and a liquid, such as hydraulic fluid or oil. One type of shock strut generally utilizes an "air-over-oil" arrangement wherein a trapped volume of gas is compressed as the shock strut is axially compressed, and a volume of oil is metered through an orifice. The gas acts as an energy storage device, such as a spring, so that upon termination of a compressing force the shock strut returns to its original length. Shock struts also dissipate energy by passing the oil through the orifice so that as the shock absorber is compressed or extended, its rate of motion is limited by the damping action from the interaction of the orifice and the oil.

While shock struts may effectively absorb energy during aircraft landing events, "hard-landing events" may result in structural damage to the aircraft and/or landing gear assemblies. A landing event is conventionally deemed "hard" (i.e., a hard-landing event) when there is a spike in pressure in the shock strut that exceeds an upper design pressure threshold. This may also be referred to as an overloading event.

SUMMARY

A shock strut assembly is disclosed herein. The shock strut assembly includes a mixed fluid chamber, a liquid chamber coupled to the mixed fluid chamber, a metering pin having a first end and a second end and a channel formed therein extending from the first end to the second end, the first end disposed in the liquid chamber and the second disposed in the mixed fluid chamber, and a pressure relief valve fluidly coupled to the liquid chamber and the channel in the metering pin, the pressure relief valve configured to allow a flow of a fluid from the liquid chamber to the channel in the metering pin.

In various embodiments, the shock strut assembly further includes a circulation tube fluidly coupled to the pressure relief valve and a joint fluidly coupled to the channel and the circulation tube. In various embodiments, the pressure relief valve is configured to allow the flow of the fluid in response to a pressure in the shock strut assembly being above a threshold. In various embodiments, the pressure relief valve is configured to prevent the flow of the fluid in response to the pressure in the shock strut assembly being below the threshold.

In various embodiments, the pressure relief valve is configured to prevent the flow of the fluid from the channel to the liquid chamber. In various embodiments, the second end of the metering pin includes an opening to the channel along an axis of the metering pin. In various embodiments, the second end of the metering pin includes a first opening to the channel and a second opening to the channel that are perpendicular to an axis of the metering pin.

Also disclosed herein is a shock strut assembly including a shock strut cylinder defining a mixed fluid chamber, a shock strut piston defining a liquid chamber, the shock strut piston operatively coupled to slide within the shock strut cylinder, a metering pin having a first end and a second end and configured to extend from the shock strut piston into the shock strut cylinder, a channel formed within the metering pin from the first end to the second end, the channel configured to allow a flow of a liquid from the liquid chamber to the mixed fluid chamber, and a pressure relief valve fluidly coupled to the liquid chamber and the channel.

In various embodiments, the shock strut assembly further includes a circulation tube fluidly coupled to the pressure relief valve and a joint fluidly coupled to the channel and the circulation tube. In various embodiments, the pressure relief valve is configured to allow the flow of the liquid in response to a pressure in the shock strut assembly being above a threshold. In various embodiments, the pressure relief valve is configured to prevent the flow of the liquid in response to a pressure in the shock strut assembly being below a threshold. In various embodiments, the pressure relief valve is configured to prevent the flow of the liquid from the channel to the liquid chamber.

In various embodiments, the shock strut piston is configured to slide in a first direction and wherein the second end of the metering pin includes an opening to the channel that is along the first direction. In various embodiments, the shock strut piston is configured to slide in a first direction and the second end of the metering pin includes a first opening extending a second direction through a sidewall of the metering pin, the second direction being perpendicular to the first direction.

Also disclosed herein is a landing gear assembly including a shock strut, a wheel assembly coupled to the shock strut, and an energy absorption system coupled to the shock strut. The energy absorption system includes a shock strut cylinder defining a mixed fluid chamber, a shock strut piston defining a liquid chamber, the shock strut piston operatively coupled to slide within the shock strut cylinder, a metering pin having a first end and a second end, the first end disposed in the shock strut piston and the second end disposed in the shock strut cylinder, a channel formed along an inner diameter of the metering pin from the first end to the second end, and a pressure relief valve coupled to the liquid chamber and the channel.

In various embodiments, the energy absorption system further includes a circulation tube fluidly coupled to the pressure relief valve and a joint fluidly coupled to the channel and the circulation tube. In various embodiments, the pressure relief valve is configured to allow a flow of a fluid in response to a pressure in the shock strut being above a threshold. In various embodiments, the pressure relief valve is configured to prevent a flow of a fluid in response to a pressure in the shock strut being below a threshold. In various embodiments, the pressure relief valve is configured to prevent a flow of a fluid from the channel to the liquid chamber. In various embodiments, the second end of the metering pin includes a first opening to the channel and a second opening to the channel that are perpendicular to an axis of the metering pin.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 2A and 2B illustrate a shock strut of an aircraft landing gear having a pressure within operating range, in accordance with various embodiments.

FIGS. 3A and 3B illustrate a shock strut of an aircraft landing gear having a pressure higher than operating range, in accordance with various embodiments.

FIGS. 4A and 4B illustrate different designs for metering pins for use in a shock strut of an aircraft landing gear, in accordance with various embodiments.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a shock strut for an aircraft including one or more pressure relief valves to provide extra dampening during a hard landing, or overload, event. The one or more pressure relief valves allow additional fluid flow from a lower chamber in the shock strut to an upper chamber in the shock strut. In various embodiments, during an overload, or hard landing, event, the pressure inside the shock strut's lower chamber may increase drastically from a normal operating pressure range P1 to an overloaded pressure range P2 that is greater than the normal operating pressure range P1. In various embodiments, the one or more pressure relief valves may open in response to the pressure exceeding P1, allowing additional fluid to flow from the lower chamber to the upper chamber through an opening in a metering pin. In various embodiments, the one or more pressure relief valves may be unidirectional so that the fluid does not flow from the upper chamber to the lower chamber.

Figure 1:
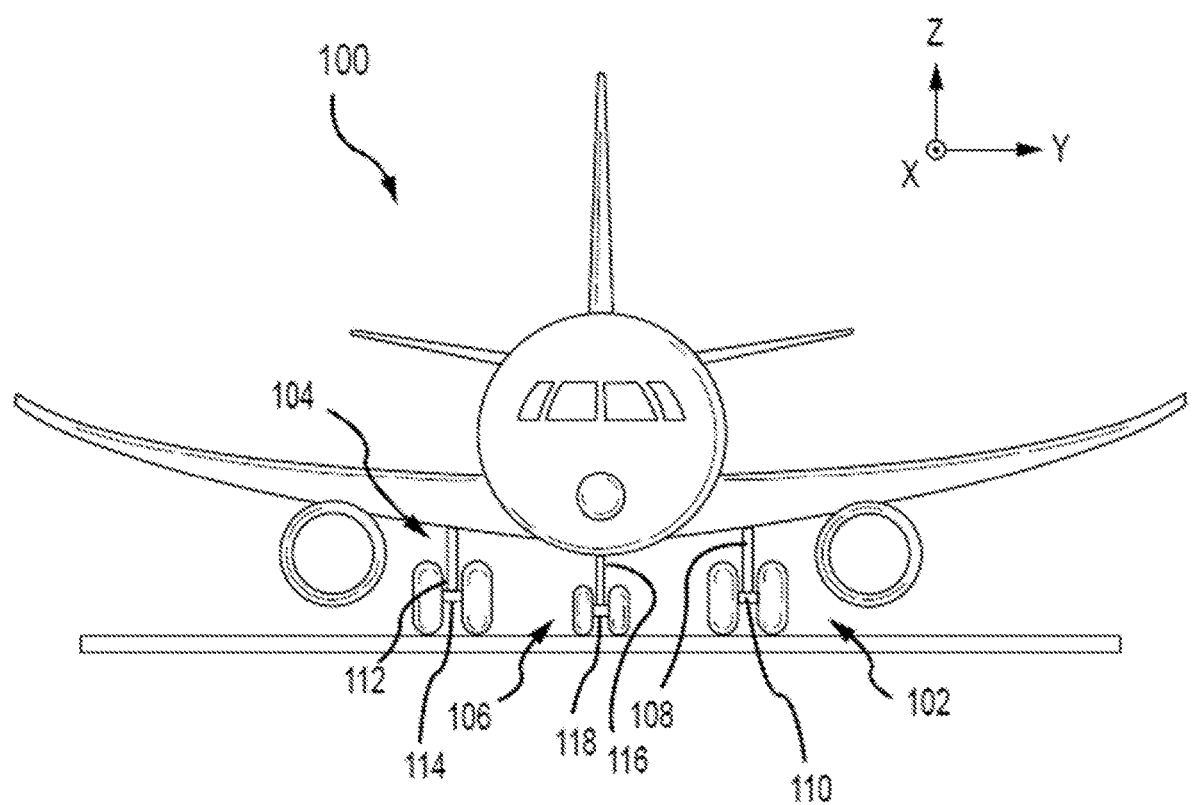
FIG. 1 illustrates an exemplary aircraft having landing gear, in accordance with various embodiments.

Referring now to FIG. 1, an aircraft 100 is illustrated, in accordance with various embodiments. In accordance with various embodiments, aircraft 100 may include one or more landing gear assemblies, such as, for example, a left landing gear assembly 102 (or port-side landing gear assembly), a right landing gear assembly 104 (or starboard-side landing gear assembly) and a nose landing gear assembly 106. Each of left landing gear assembly 102, right landing gear assembly 104, and nose landing gear assembly 106 may support aircraft 100 when not flying, allowing aircraft 100 to taxi, takeoff, and land safely and without damage to aircraft 100. In various embodiments, left landing gear assembly 102 may include a left shock strut assembly 108 and a left wheel assembly 110, right landing gear assembly 104 may include a right shock strut assembly 112 and a right wheel assembly 114, and nose landing gear assembly 106 may include a nose shock strut assembly 116 and a nose wheel assembly 118.

Referring now to FIGS. 2A and 2B, a landing gear assembly 200, similar to the landing gear assemblies described above with reference to FIG. 1, is illustrated. Landing gear assembly 200 includes an energy absorption system 250. FIG. 2A illustrates a cross section of landing gear assembly 200 and FIG. 2B illustrates an enlarged cross section of energy absorption system 250 of landing gear assembly 200. In accordance with various embodiments, landing gear assembly 200 includes a shock strut 202, which itself may include a shock strut cylinder 204 and a shock strut piston 206. Shock strut piston 206 is operatively coupled to slide or telescope within shock strut cylinder 204. Shock strut piston 206 may include a first end 208 disposed within shock strut cylinder 204 and a second end 210 extending from shock strut cylinder 204. Shock strut cylinder 204 may be configured to receive shock strut piston 206 in a manner that allows the two components to telescope together and absorb and dampen forces transmitted thereto.

FIGS. 2A and 2B illustrate shock strut 202 under a normal operating pressure P1. When in a compressed position, shock strut piston 206 will have translated, or slid, a distance (e.g., in the positive z-direction) into shock strut cylinder 204 from that illustrated in FIG. 2A.

Shock strut cylinder 204 may be divided into a liquid chamber 212 and a mixed fluid chamber 214 as indicated by a line 213. In various embodiments, a liquid, such as, for example, hydraulic fluid or oil may be located within liquid chamber 212. Further, a gas, such as nitrogen or air, may be located within mixed fluid chamber 214. In various embodiments, shock strut 202 includes an orifice plate 220 configured to separate liquid chamber 212 (also referred to herein as a first chamber or a dynamic liquid chamber) from mixed fluid chamber 214 (also referred to herein as a second chamber or a mixed gas/liquid chamber). In this regard, during operation, the liquid, such as, for example, hydraulic fluid or oil, may be located within liquid chamber 212 (or the first or dynamic liquid chamber) and a mixture of a gas, such as, for example, nitrogen or air, and the liquid may be located within mixed fluid chamber 214 (or the second or mixed gas/liquid chamber).

Shock strut 202 includes a metering pin 222 coupled to shock strut piston 206 and configured to translate with shock strut piston 206. In various embodiments, metering pin 222 is received by and extends through orifice plate 220. Orifice plate 220 may comprise a metering pin aperture 224 configured to receive metering pin 222. In various embodiments, metering pin 222 includes a metering flute (or a plurality of metering flutes) disposed along the length (e.g., along the Z-direction) of the metering pin 222. As described herein, the metering flute defines a flow channel between metering pin 222 and metering pin aperture 224 of orifice plate 220 through which liquid may travel from liquid chamber 212 to mixed fluid chamber 214 in response to shock strut 202 moving to a compressed position from an extended position. Metering pin 222 has a first end 230 (e.g., the negative z-direction) and a second end 232 (e.g., the positive z-direction). In various embodiments, metering pin 222 may be tapered such that first end 230 being wider than second end 232.

In various embodiments, orifice plate 220 is housed within a retainer housing 226 and may include a retainer plate. Both orifice plate 220 and the retainer plate are typically annular in shape and secured to an orifice support tube 228. Retainer housing 226 and, in various embodiments the retainer plate, are configured to restrict, but not prevent, the flow of fluid (e.g., liquid and/or gas) from liquid chamber 212 into mixed fluid chamber 214 during compression of shock strut 202. Orifice plate 220 may translate away from retainer housing 226 during compression of shock strut 202 and translate toward retainer housing 226 during extension of shock strut 202. In various embodiments, orifice plate 220 may be free to move within a channel formed in the orifice retainer plate.

Referring now to FIG. 2B, the enlarged view of energy absorption system 250 further shows that the energy absorption system 250 includes one or more pressure relieve valves 252, a circulation tube 254, a joint 256, a channel 258 formed through metering pin 222, and an opening 260 formed in second end 232 of metering pin 222. Energy absorption system 250 is configured to reduce the pressure in shock strut 202 in response to a pressure spike above normal operating pressure P1 such as during hard landing event. The pressure in shock strut 202 is reduced by allowing a flow of the fluid in liquid chamber 212 to pass through the one or more pressure relieve valves 252, through circulation tube 254, joint 256, channel 258, and opening 260 into mixed fluid chamber 214.

In the illustrated embodiments, there are two pressure relieve valves 252. In various embodiments, there may be one or more than two pressure relieve valves 252 depending on the aircraft and landing gear design. Pressure relief valves 252 are coupled to a bottom portion of liquid chamber 212 (e.g., in the z-direction) to allow fluid to leave liquid chamber 212. In various embodiments, pressure relieve valves 252 may be unidirectional, allowing fluid to flow in a first direction but not in an opposite, second direction. That is, pressure relief valve 252 may allow fluid to flow out liquid chamber 212 through metering pin 222 (e.g., in the positive z-direction) but not into liquid chamber 212 through metering pin 222 (e.g., in the negative z-direction). In other words, pressure relief valve 252 may allow fluid to flow downward from liquid chamber 212 into circulation tube 254 (e.g., in the negative z-direction) but not upward from circulation tube 254 into liquid chamber 212 (e.g., in the positive z-direction)

Circulation tube 254 may include a plurality of tubes, each of which is coupled to one pressure relief valve 252 at one and to joint 256 at the other end. Circulation tube 254 provides a fluid path from pressure relief valve 252 to joint 256.

Joint 256 is coupled to metering pin 222, and more specifically to channel 258, at one end and to circulation tube 254 at the other end. In various embodiments, joint 256 may be a T-joint, as illustrated in FIGS. 2A and 2B, having two connection points for circulation tube 254. In various embodiments, joint 256 may more than two connection points for circulation tube 254, depending on the number of pressure relief valves 252 in shock strut 202.

Channel 258 is formed along an inner diameter of metering pin 222 (e.g., along the z-axis). Channel 258 extends the entire length of metering pin 222 being coupled to joint 256 at one end and opening to mixed fluid chamber 214 through opening 260 at the other end. Channel 258 has a diameter that may vary based on design choices and an amount of fluid that will flow through channel 258. In various embodiments, channel 258 includes a plurality of individual and/or separate channels formed through metering pin 222. Therefore, it should be appreciated that while a single channel 258 is illustrated for ease of discussion and description, there may be, it should be appreciated that channel 258 may include a plurality of individual channels formed through metering pin 222. Accordingly, in various embodiments, there may be multiple channels that may each extend through the entire length of metering pin 222, may extend through a portion of the length of metering pin 222, may split from a single channel into multiple channels, and may combine from multiple channels into a single channel, among other configurations, depending on design parameters.

Referring now to FIGS. 3A and 3B, landing gear assembly 200 is illustrated under during a high pressure event, in accordance with various embodiments. FIG. 3B illustrates a cross section of landing gear assembly 200 and FIG. 2B illustrates an enlarged cross section of energy absorption system 250 of landing gear assembly 200. FIGS. 3A and 3B illustrate shock strut 202 under an overload pressure P2.

Generally, pressure relief valves 252 restrict a flow of liquid from liquid chamber 212 into circulation tube under normal operating pressures P1, as illustrated in FIGS. 2A and 2B. In various embodiments, normal operating pressure P1 may be a range of pressures for which shock strut 202 is designed, as described in FIG. 5. However, pressure relief valves 252 allow the flow of liquid into circulation tubes 254 in response to an overload pressure P2, as illustrated in FIGS. 3A and 3B, that is greater than normal operating pressure P1. Overload pressure P2 may be any pressure that exceeds the upper range of normal operating pressure P1. In various embodiments, pressure relief valve 252 may be calibrated for use with each configuration of aircraft 100 and landing gear assembly 200 resulting in different ranges for normal operating pressure P1 and overload pressure P2 for each different configuration.

During a hard landing, or overload, event, the pressure in shock strut 202 may increase above normal operating pressure P1 and into overload pressure P2. The increase to overload pressure P2 triggers pressure relief valve 252 to allow a flow of liquid from liquid chamber 212 into circulation tube 254 and through joint 256 and channel 258 into mixed fluid chamber 214, as indicated by arrows 262. After the hard landing, or overload, event, the pressure in shock strut 202 may decrease below overload pressure P2 back to normal operating pressure P1. However, pressure relief valves 252 do not allow a flow of liquid from circulation tube 254 back to lower chamber.

Referring now to FIGS. 4A and 4B, cross section views of a metering pin 400 and a metering pin 450 that may be used in shock strut 202 are illustrated, in accordance with various embodiments. Referring first to FIG. 4A, metering pin 400 has a first end 402 including a first opening 404, a second end 406 including a second opening 408, and a channel 410 formed through metering pin 400 extending from first opening 404 to second opening 408. Channel 410 may be an example of channel 258 described above in FIGS. 3A and 3B. Channel 410 allows fluid to flow through metering pin 400, as previously described.

Referring next to FIG. 4B, metering pin 450 has a first end 452 including a first opening 454, a second end 456 including a second opening 458a and a third opening 458b, and a channel 460 formed through metering pin 450 extending from first opening 454 to second opening 458a and third opening 458b. Channel 460 may be an example of channel 258 described above in FIGS. 3A and 3B. Channel 460 allows fluid to flow through metering pin 400, as previously described. Second opening 258a and third opening 258b may be formed through a sidewall of metering pin 450, directing the flow of fluid perpendicular to channel 460 (e.g., along the x-axis). In various embodiments, second opening 258a and third opening 258b may be formed at an angle α1 relative to metering pin 450 (e.g., the z-axis). In the illustrated embodiment, angle α1 is about 90° from metering pin 450 resulting in a fluid flow that is perpendicular to channel 460. In various embodiments, second opening 258a and third opening 258b may be formed at a downward angle (e.g., in the negative z-direction) or at an upward angle (e.g., in the positive z-direction) relative to metering pin 450. In various embodiments, angle α1 is about 30° to about 150° from metering pin 450 (e.g., along the z-axis), and more specifically about 45° to about 135°. While two openings are illustrated (i.e., second opening 258a and third opening 258b), in various embodiments, a plurality of openings may be formed through the sidewall of metering pin 450. In various embodiments, the plurality of openings may be formed circumferentially around metering pin 450 and/or along a length of metering pin 450 (e.g., along the z-axis). In various embodiments, this reduces spray of fluid in mixed fluid chamber 214 of shock strut 202. In various embodiments, a metering pin may include a features of metering pin 400 and metering pin 450 such that a plurality of openings are formed through a sidewall of the metering pin and an opening is formed through a top end (e.g., in the positive z-direction) of the metering pin.

Figure 5:
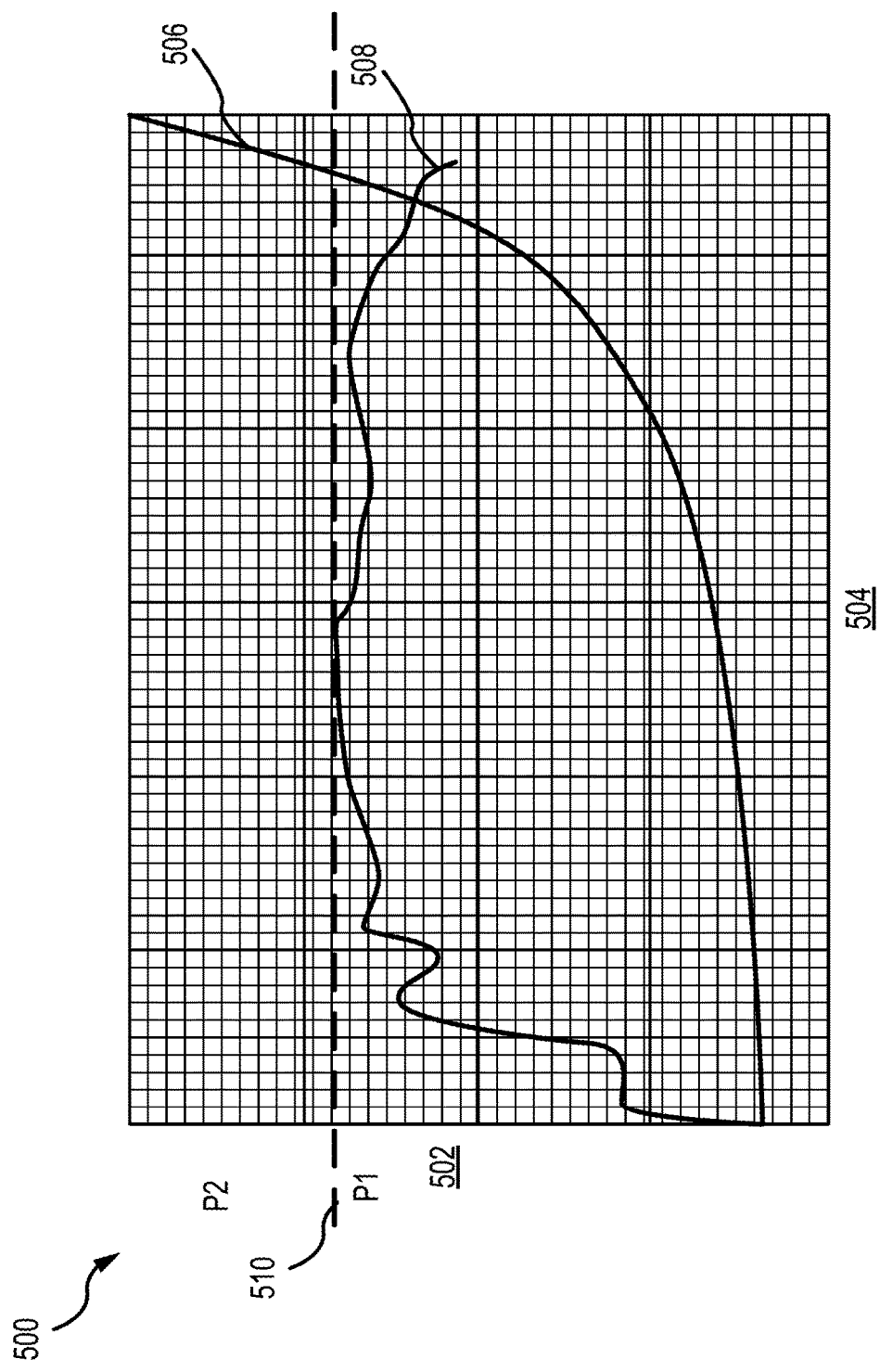
FIG. 5 illustrates a plot of a shock strut load as a function of the shock strut stroke, in accordance with various embodiments.

Referring now to FIG. 5, a plot 500 of a shock strut load 502 as a function of the shock strut stroke 504 is illustrated, in accordance with various embodiments. Plot 500 may be used to determine a calibration setting for pressure relief valve 252. As previously mentioned, each shock strut 202 may have a different calibration setting for pressure relief valve 252. A first line 506 illustrates a static shock strut load 502 increasing as the shock strut stroke 504 increases. Generally, as the shock strut stroke 504 of shock strut 202 increases (e.g., along axis of shock strut stroke 504) the load 502 on shock strut 202 increases in a predictable manner, as illustrated by first line 506. The slope of first line 506 may be different for different shock struts 202. A second line 508 illustrates a dynamic shock strut load 502 as with respect to the increase in shock strut stroke 504. That is, second line 508 illustrates the shock strut load 502 on shock strut 202 during a landing event (or a dynamic event). As illustrated, the shock strut load 502 may increase dramatically with little to no increase in the stroke of shock strut 202. Again, each shock strut design (e.g., shock strut 202) may have different dynamic characteristics identified by second line 508. Plot 500 further includes a threshold 510 indicating a threshold at which normal operating pressure P1 becomes overload pressure P2. A hard landing, or overload, event may be defined as a specific shock strut load 502 for each shock strut by using second line 508 and threshold 510. The calibration settings for pressure relief valve 252 may be determined for each different shock strut based on what load defines a hard landing event as provided by second line 508. In various embodiments, threshold 510 may be based on information from plot 500.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A shock strut assembly, comprising:
   a mixed fluid chamber;
   a liquid chamber coupled to the mixed fluid chamber;
   a metering pin having a first end and a second end and a channel formed therein extending from the first end to the second end, the first end disposed in the liquid chamber and the second disposed in the mixed fluid chamber, wherein the metering pin is tapered with the first end of the metering pin being wider than the second end of the metering pin and wherein the metering pin includes a plurality of metering flutes coupled to the channel and disposed through a sidewall of the metering pin along a length of the metering pin;
   an orifice plate configured to separate the liquid chamber from the mixed fluid chamber, the orifice plate comprising a metering pin aperture configured to receive the second end of the metering pin, wherein the plurality of metering flutes defines a flow channel between the metering pin and the metering pin aperture of the orifice plate through which liquid may travel from the liquid chamber to the mixed fluid chamber in response to a shock strut moving to a compressed position from an extended position; and
   a pressure relief valve fluidly coupled to the liquid chamber and the channel in the metering pin, the pressure relief valve configured to allow a flow of a fluid from the liquid chamber to the channel in the metering pin.

2. The shock strut assembly of claim 1, further comprising:
   a circulation tube fluidly coupled to the pressure relief valve; and
   a joint fluidly coupled to the channel and the circulation tube.

3. The shock strut assembly of claim 1, wherein the pressure relief valve is configured to prevent the flow of the fluid from the channel to the liquid chamber.

4. The shock strut assembly of claim 1, wherein the second end of the metering pin includes an opening to the channel along an axis of the metering pin.

5. The shock strut assembly of claim 1, wherein the second first end of the metering pin includes a first opening to the channel and a second opening to the channel that are perpendicular to an axis of the metering pin.

6. The shock strut assembly of claim 1, wherein the pressure relief valve is configured to allow the flow of the fluid in response to a pressure in the shock strut assembly being above a threshold.

7. The shock strut assembly of claim 6, wherein the pressure relief valve is configured to prevent the flow of the fluid in response to the pressure in the shock strut assembly being below the threshold.

8. A shock strut assembly, comprising:
   a shock strut cylinder defining a mixed fluid chamber;
   a shock strut piston defining a liquid chamber, the shock strut piston operatively coupled to slide within the shock strut cylinder;
   a metering pin having a first end and a second end and configured to extend from the shock strut piston into the shock strut cylinder, wherein the metering pin is tapered with the first end of the metering pin being wider than the second end of the metering pin and wherein the metering pin includes a plurality of metering flutes coupled to the channel and disposed through a sidewall of the metering pin along a length of the metering pin;
   an orifice plate configured to separate the liquid chamber from the mixed fluid chamber, the orifice plate comprising a metering pin aperture configured to receive the second end of the metering pin, wherein the plurality of metering flutes defines a flow channel between the metering pin and the metering pin aperture of the orifice plate through which a liquid may travel from the liquid chamber to the mixed fluid chamber in response to a shock strut moving to a compressed position from an extended position;
   a channel formed within the metering pin from the first end to the second end, the channel configured to allow a flow of the liquid from the liquid chamber to the mixed fluid chamber; and
   a pressure relief valve fluidly coupled to the liquid chamber and the channel.

9. The shock strut assembly of claim 8, further comprising:
a circulation tube fluidly coupled to the pressure relief valve; and
a joint fluidly coupled to the channel and the circulation tube.

10. The shock strut assembly of claim 8, wherein the pressure relief valve is configured to allow the flow of the liquid in response to a pressure in the shock strut assembly being above a threshold.

11. The shock strut assembly of claim 8, wherein the pressure relief valve is configured to prevent the flow of the liquid in response to a pressure in the shock strut assembly being below a threshold.

12. The shock strut assembly of claim 8, wherein the pressure relief valve is configured to prevent the flow of the liquid from the channel to the liquid chamber.

13. The shock strut assembly of claim 8, wherein the shock strut piston is configured to slide in a first direction and wherein the second end of the metering pin includes an opening to the channel that is along the first direction.

14. The shock strut assembly of claim 8, wherein the shock strut piston is configured to slide in a first direction and the first end of the metering pin includes a first opening to the channel and a second opening to the channel that are perpendicular to an axis of the metering pin.

15. A landing gear assembly, comprising:
a shock strut;
a wheel assembly coupled to the shock strut; and
an energy absorption system coupled to the shock strut, the energy absorption system including:
a shock strut cylinder defining a mixed fluid chamber;
a shock strut piston defining a liquid chamber, the shock strut piston operatively coupled to slide within the shock strut cylinder;
a metering pin having a first end and a second end, the first end disposed in the shock strut piston and the second end disposed in the shock strut cylinder, wherein the metering pin is tapered with the first end of the metering pin being wider than the second end of the metering pin and wherein the metering pin includes a plurality of metering flutes coupled to the channel and disposed through a sidewall of the metering pin along a length of the metering pin;
an orifice plate configured to separate the liquid chamber from the mixed fluid chamber, the orifice plate comprising a metering pin aperture configured to receive the second end of the metering pin, wherein the plurality of metering flutes defines a flow channel between the metering pin and the metering pin aperture of the orifice plate through which liquid may travel from the liquid chamber to the mixed fluid chamber in response to the shock strut moving to a compressed position from an extended position;
a channel formed along an inner diameter of the metering pin from the first end to the second end; and
a pressure relief valve coupled to the liquid chamber and the channel.

16. The landing gear assembly of claim 15, the energy absorption system further comprising:
a circulation tube fluidly coupled to the pressure relief valve; and
a joint fluidly coupled to the channel and the circulation tube.

17. The landing gear assembly of claim 15, wherein the pressure relief valve is configured to allow a flow of a fluid in response to a pressure in the shock strut being above a threshold.

18. The landing gear assembly of claim 15, wherein the pressure relief valve is configured to prevent a flow of a fluid in response to a pressure in the shock strut being below a threshold.

19. The landing gear assembly of claim 15, wherein the pressure relief valve is configured to prevent a flow of a fluid from the channel to the liquid chamber.

20. The landing gear assembly of claim 15, wherein the second first end of the metering pin includes a first opening to the channel and a second opening to the channel that are perpendicular to an axis of the metering pin.

* * * * *

UNITED STATES PATENT AND TRADEMARK OFFICE
CERTIFICATE OF CORRECTION

PATENT NO. : 12,404,015 B2
APPLICATION NO. : 18/447935
DATED : September 2, 2025
INVENTOR(S) : Hemanth M N et al.

Page 1 of 1

It is certified that error appears in the above-identified patent and that said Letters Patent is hereby corrected as shown below:

In the Claims

Claim 5, Column 10, Line 25 -please delete "second"
Claim 20, Column 12, Line 37 -please delete "second"

Signed and Sealed this
Twenty-seventh Day of January, 2026

John A. Squires
*Director of the United States Patent and Trademark Office*